(No Model.)

C. P. CROWE.
VEHICLE SPRING.

No. 371,435. Patented Oct. 11, 1887.

Witnesses.
R. F. Gardner
Edm. P. Ellis.

Inventor.
C. P. Crowe,
per F. A. Lehmann,
Atty.

United States Patent Office.

CHARLES PHILLIP CROWE, OF MOUNT GILEAD, OHIO.

VEHICLE-SPRING.

SPECIFICATION forming part of Letters Patent No. 371,435, dated October 11, 1887.

Application filed June 13, 1887. Serial No. 241,146. (No model.)

*To all whom it may concern:*

Be it known that I, CHARLES PHILLIP CROWE, of Mount Gilead, in the county of Morrow and State of Ohio, have invented certain new and useful Improvements in Vehicle-Springs; and I do hereby declare the following to be a full, clear, and exact description of the invention, such as will enable others skilled in the art to which it pertains to make and use it, reference being had to the accompanying drawings, which form part of this specification.

My invention relates to an improvement in vehicle-springs; and it consists in the combination of the leaves, one of which has its end coiled so as to form an eye through which the fastening-bolt passes, and the other having its end coiled around the eye, with the two cap-pieces which fit over opposite edges of the ends of the spring, and the tightening-bolt which passes through these caps and secures them to the spring, as will be more fully described hereinafter.

The object of my invention is to coil the ends of the leaves one around the other and protect the ends of the leaves by means of cap-pieces which are applied thereto, thus preventing the strain and wear upon the bolt and caps and producing a spring at less cost than with the ordinary head.

Figure 1:
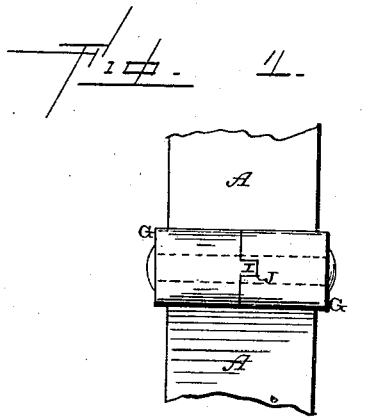
Figure 2:
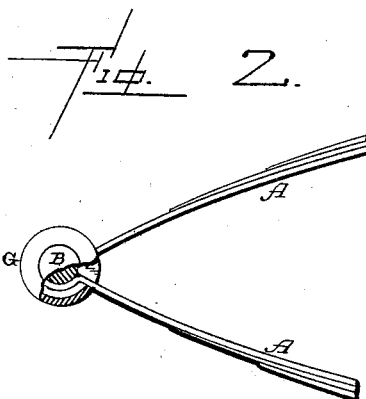
Figure 3:
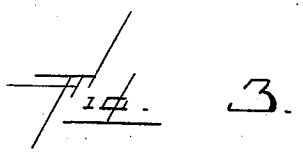

Figure 1 is an end view of a spring embodying my invention. Fig. 2 is a side elevation of one end of the spring. Fig. 3 is a vertical section taken through the fastening-bolt.

A represents the two leaves of the spring, one of which has its end coiled into an eye, through which the fastening bolt B passes. The other leaf has its end coiled around the eye thus formed, whereby the ends of the two leaves are fastened together, so that they cannot get loose or rattle, and at the same time prevent all wear of the bolt. Placed over opposite edges of the ends of the leaves are the caps G, which are closed at their ends, with the exception of the holes through which the fastening-bolt passes, and which are cut away on their inner sides just sufficiently to allow the leaves to freely close and open. One of these cap-pieces is provided with a lug or projection, I, which catches in a corresponding recess, J, in the other cap-piece, and thus the two are always held in line with each other and made to move together. The fastening-bolt passes through the coiled ends of the two leaves and through the cap-pieces and binds the ends of the springs together and the cap-pieces in position thereon. As these two cap-pieces fit firmly to the end of the upper leaf, which is coiled around the eye, and closely together, there is no rattling or noise and there is no wear on the bolt, while a freer movement of the leaves is obtained, and consequently a greater amount of elasticity.

The bolt which passes through the parts can be of any shape or size desired, so that it will allow the leaves a free movement upon each other.

Having thus described my invention, I claim—

The combination of the leaves of the spring having their ends connected together, the fastening bolt, and the two parts of the cap, one of which is provided with a lug and the other with a socket, substantially as described.

In testimony whereof I affix my signature in presence of two witnesses.

CHARLES PHILLIP CROWE.

Witnesses:
A. K. DUNN,
H. E. LAMBERT.